United States Patent [19]
Fathauer

[11] 3,794,911
[45] Feb. 26, 1974

[54] WEIGHT RESPONSIVE MOISTURE TESTER HAVING TIME DELAY MEANS AND TEMPERATURE COMPENSATION

[75] Inventor: George H. Fathauer, Decatur, Ill.

[73] Assignee: Dickey-John Corporation, Chatham, Ill.

[22] Filed: Aug. 23, 1972

[21] Appl. No.: 283,216

[52] U.S. Cl. ............................................ 324/61 QS
[51] Int. Cl. ................................................ G01r 27/26
[58] Field of Search ........................ 324/61 QS, 61 R

[56] References Cited
UNITED STATES PATENTS

| | | | |
|---|---|---|---|
| 3,691,457 | 9/1972 | Kriellaars | 324/61 R |
| 3,090,004 | 5/1963 | Breen et al. | 324/61 QS |
| 3,028,549 | 4/1962 | Stein | 324/61 R |
| 3,081,429 | 3/1963 | Moe | 324/61 R |
| 3,226,635 | 12/1965 | Moe | 324/61 R |
| 3,559,052 | 1/1971 | Fathauer | 324/61 R |
| 3,566,260 | 2/1971 | Johnston | 324/61 R |
| 3,681,685 | 8/1972 | Tarry et al. | 324/61 QS |

*Primary Examiner*—Stanley T. Krawczewicz
*Attorney, Agent, or Firm*—Olson, Trexler, Walters & Bushnell

[57] ABSTRACT

A grain sample moisture tester comprises a reference oscillator and a variable oscillator, the latter having a capacitor across its tank circuit that constitutes a test cell such that the dielectric constant of the capacitor is modified in accordance with the dielectric constant of the grain sample. The test cell is suspended on a frame or chassis such that when a predetermined amount of grain has been introduced into the test cell, a switch is closed to initiate a digital measuring circuit to provide a moisture reading. The readout is accomplished by relating the frequency of the variable oscillator to the frequency of the reference oscillator. Auxiliary temperature correction circuitry can be activated after the initial moisture determination has been made to correct the readout for temperature variations from a reference temperature.

21 Claims, 11 Drawing Figures

PATENTED FEB 26 1974 3,794,911

3,794,911

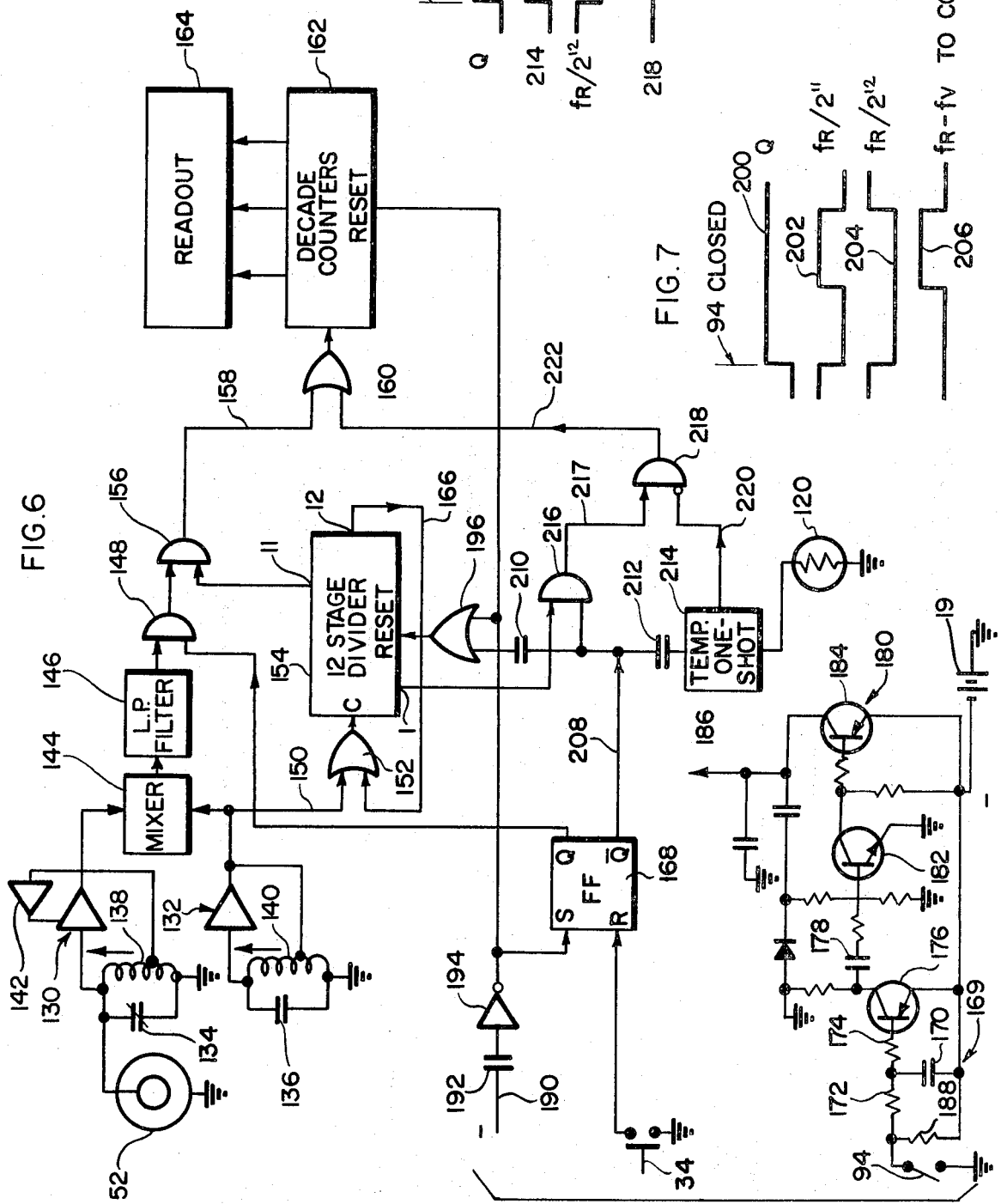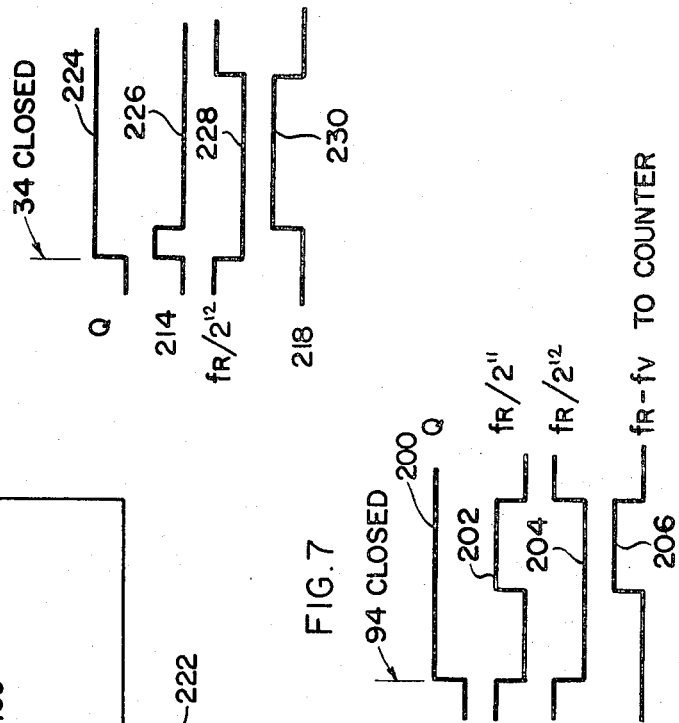

WEIGHT RESPONSIVE MOISTURE TESTER HAVING TIME DELAY MEANS AND TEMPERATURE COMPENSATION

BACKGROUND OF THE INVENTION

This invention relates to moisture testing apparatus, and more particularly to apparatus for testing the moisture content of grain, such as corn and the like.

In measuring the moisture content of grain, it is known to utilize a test cell that comprises a capacitor in which the grain sample is introduced and based upon which a reading, representative of moisture content, is obtained. Since grain moisture is defined as percentage by weight of moisture, it has been necessary to use a weighed grain sample in order to obtain an accurate moisture reading. This procedure usually involves first weighing a sample and then introducing the sample into the test cell. A reading on the instrument may be obtained which is representative of the moisture content. This readout may be directly from a properly calculated meter, or the readout may be used in conjunction with a chart. After the reading has been obtained, however, it is necessary to correct the reading for temperature. The temperature of the sample is then measured, and by reference to a suitable table or chart, a temperature-corrected reading may be obtained. The foregoing procedures are less than satisfactory due to the inconvenience of the separate weighing and measuring steps. Furthermore, there is the additional inconvenience of having to perform a further step in making the temperature correction.

OBJECTS AND SUMMARY OF THE INVENTION

It is an object of this invention to provide a moisture tester which is exceedingly convenient to use, is high speed in operation, and eliminates the need for separately weighing the sample prior to introduction of the same into the test cell.

It is a further object of this invention to provide a moisture tester of the type stated in which the sample is weighed by simply pouring the sample material into the test cell. When the proper weight of sample material is in the test cell, a test cell-operated switch automatically is closed for initiation of high speed electronic circuitry that provides a direct readout of moisture content.

It is also an object of the invention to provide an arrangement that compensates for the inertia effect of pouring material into the test cell. Thus, the inertia of the being-poured material may cause the aforesaid switch to close before the desired amount of sample material is in the test cell. Accordingly, there is provided a built in time delay circuit which inhibits the initiation of the actual measuring circuitry long enough so that under anticipated pouring conditions the desired weight of sample material will be in the test cell when the measurement is actually taken.

It is also an object of this invention to provide a moisture tester of the type stated in which the test cell is resiliently suspended in a manner to facilitate reliably closing the moisture measurement initiation switch each time the unit is operated.

It is a still further object of this invention to provide a moisture tester of the type stated which incorporates high speed temperature correction circuitry adapted to be enabled after the moisture reading has taken place so as to correct the readout for temperature.

A still further object of this invention is to provide a moisture tester of the type stated in which the test cell has an annular configuration, which facilitates proper loading of the sample into the test cell.

In accordance with the foregoing objects the moisture tester has a test cell that comprises a capacitor having means including spaced electrodes providing a chamber for receiving a sample to be tested such that the dielectric constant of the capacitor is modified in accordance with the dielectric constant of the sample due to moisture therein. Measuring circuit means, including the test cell capacitor, are provided for issuing signals in accordance with the moisture content of the sample. Also provided are means responsive to the issued signal for providing a visual readout representative of the moisture content. Initiating means are also provided and are operable in response to the accumulation of a predetermined weight of sample in the chamber for triggering the operation of the circuit means. The initiating means comprises the aforesaid test cell switch that is closed by deflection of the test cell and a time delay circuit arranged so that the operation of the measuring circuit is triggered upon closing of the switch followed by the time delay of the time delay circuit. The measuring circuit operation, following the delay, completes its cycle in a very brief time, in the order of a millisecord, so that continued pouring in of sample material into the test cell has no effect on the moisture measurement. The measuring circuit also includes a variable frequency oscillator and a reference oscillator. The capacitor of the test cell is across the tank circuit of the variable oscillator. The measuring circuitry further includes means for relating the outputs of the two oscillators to provide a series of pulses which are received by a counter which, in turn, drives a visual readout device.

The outputs of the variable and reference oscillators are related in accordance with two examples of arrangements of frequency counting to effect readout. In one example, the difference in the frequencies of the oscillators is gated to the counter for an ascertained time interval as determined by the frequency of the reference oscillator. In another arrangement the frequency of the variable oscillator is divided down for a time base against which the output of the reference oscillator is counted.

The temperature correction circuitry uses a thermistor sensor in the test cell that operates a monostable multivibrator, the latter having an on-time in accordance with the temperature of the sample. This on-time is used to control the operation of a gate such that a number of pulses are sent to the counter to adjust its reading. If the sample is at the reference temperature, a predetermined number of pulses will be sent into the counter, for example, 1,000 pulses, where a three decade counter is used. This simply recycles the counter without change in its final reading. Where the sample temperature departs from the reference temperature, the on-time of the multivibrator will shift, gating more or fewer pulses into the counter. Furthermore, the temperature correction circuitry is put in operation by a manually operable switch which is intended to be closed after the moisture readout has been made. Thus, operation of the temperature correction switch provides an instantaneous temperature-corrected readout.

The delay circuit, in addition to compensating for inertia effects of pouring sample material into the test cell, as aforesaid, also turns off the power to the measuring circuitry after a predetermined period of time. As a result, the battery power supply of the instrument will not be drained by the measuring circuitry if the sample is left in the instrument. Furthermore, the delay circuit permits rapid repetitive tests because the power supply to the measuring circuitry is quickly turned off when sample material is poured out of the cell. Finally, the measuring will proceed if the switch contacts of the measuring switch are momentarily broken.

BRIEF DESCRIPTION OF THE FIGURES

FIG. 6 is a logic diagram illustrating one moisture measuring technique in accordance with the invention;

FIGS. 7 and 8 show wave forms as a function of time at certain points within the system during operation of the instrument utilizing the arrangement of FIG. 6;

DETAILED DESCRIPTION

Figure 1:
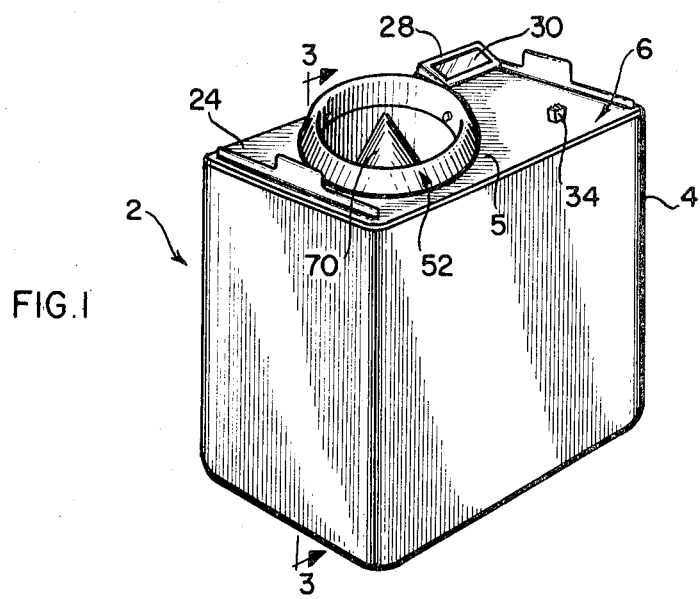
FIG. 1 is a perspective view of a moisture tester instrument constructed in accordance with and embodying the present invention.

Referring now in more detail to the drawing, particularly FIGS. 1-5, there is shown a moisture tester 2, that comprises a generally rectangular sheet metal receptacle 4 that telescopically receives a chassis 6. On one of its sides 8, the receptacle 4 has a U-shaped handle 9 that is secured in place by screws 13. Also within the receptacle 4 and secured to the side 8 interiorly thereof by the screws 13 is a sheet metal, dual channel member 14. This channel member 14 has spaced apart vertically extending channel sections 16, 18 which serve to receive dry cell batteries 19 constituting the power supply for operation of the instrument. The upper and lower ends of the channel section 16, 18 are provided with insulating strips 20 that have metallic contacts for the batteries. Leading from one of those contacts is a wire 22 that connects to the circuitry of the instrument, the other side of the line being grounded through the receptacle 4. The batteries 19 may be removed and replaced by removing the screws 13 after having first removed the chassis 6 from within the receptacle 4.

The chassis 6 comprises a top member 24 having a depending marginal flange 26 (FIG. 5) that snugly telescopes within the upper end portion of the receptacle 4, leaving the top surface 5 of the top member exposed. At one corner the top member 24 has an integrally formed, raised ridge 28 below which is the screen 30 of a readout device, the purpose of which will hereinafter be more fully described. Also at one side of the top member 24 and underneath the same is a printed circuit board 32 that supports some of the component circuitry of the instrument. Additionally, the top member 24 supports a temperature correction push button switch 34, the purpose of which will likewise be hereinafter described.

Figure 2:
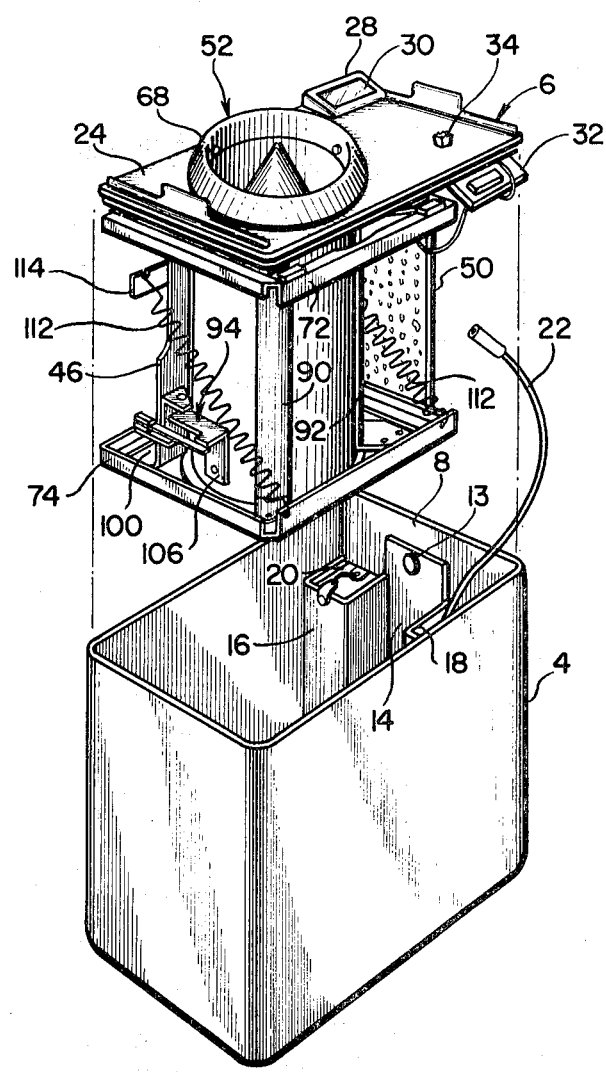
FIG. 2 is an exploded perspective view of the instrument.
Figure 3:
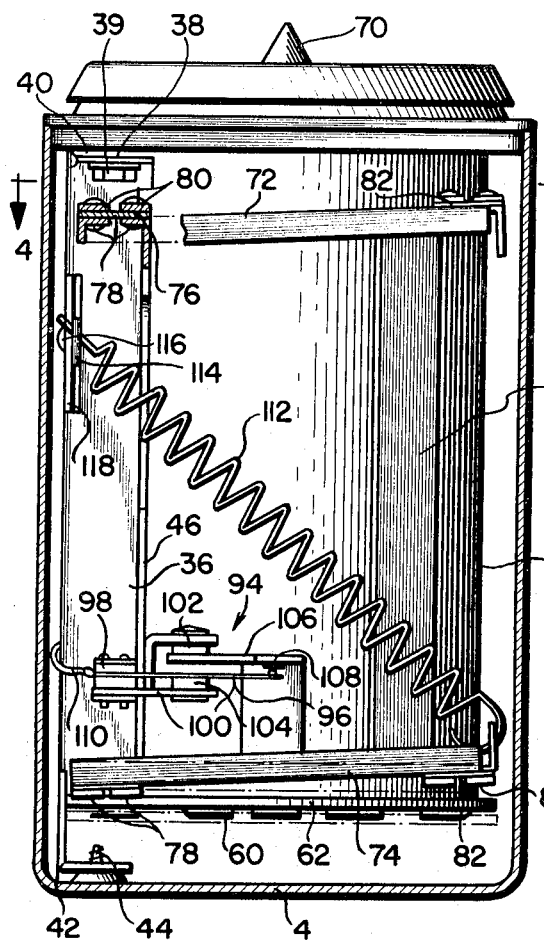
FIG. 3 is a sectional view taken along line 3—3 of FIG. 1.
Figure 5:
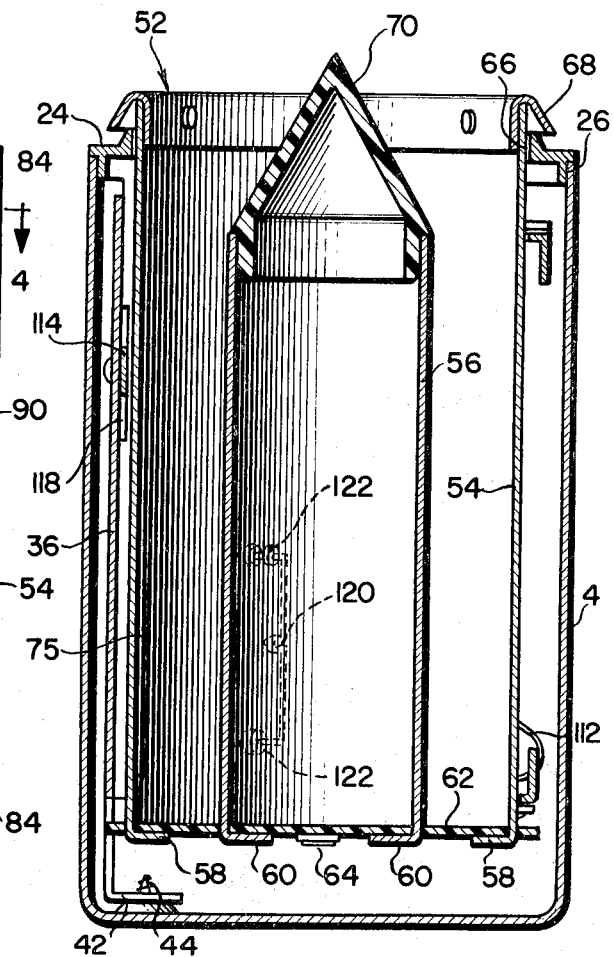
FIG. 5 is a sectional view taken along line 5—5 of FIG. 4.

The chassis 6 also includes a depending channel plate 36, the upper end of which has ears 38 that are secured by bolt and nut assemblies 39 to depending bosses 40 on the under side of the top member 24. The lower end of the channel plate 36 has an L-shaped extension 42 which is apertured to receive a sheet metal screw 44 that passes through a countersunk hole in the bottom of the receptacle 4 for securing the chassis 6 assembled with the receptacle 4. Thus, by removing the screw 44 and disconnecting the power lead wire 22, the entire chassis 6, with all parts thereon, may be removed from the receptacle 4, as is shown in FIG. 2.

Figure 4:
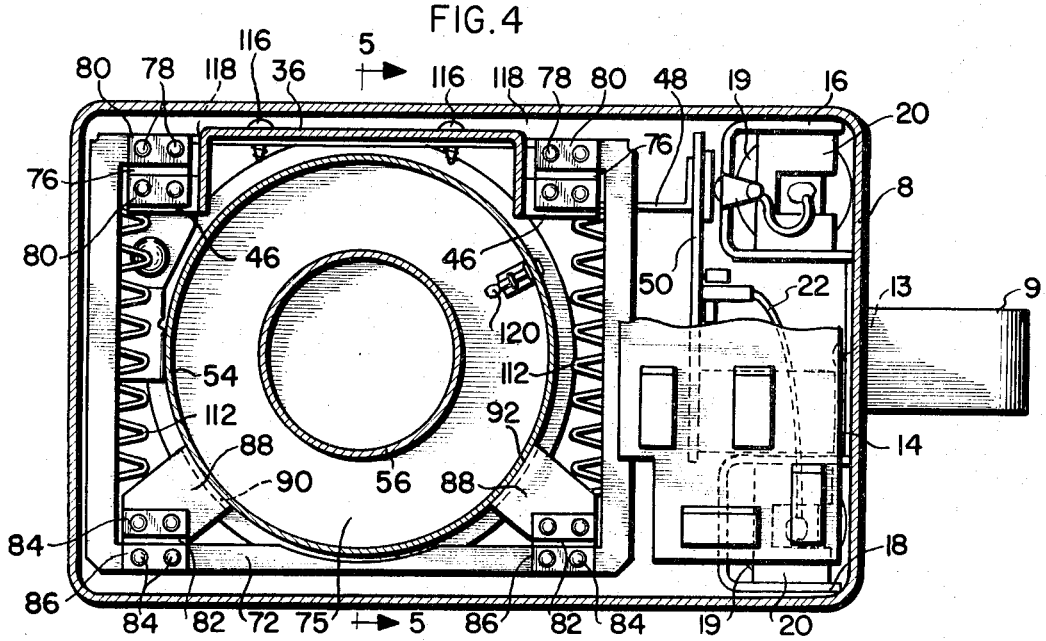
FIG. 4 is a sectional view taken along line 4—4 of FIG. 3.

The channel plate 36 also includes lateral wings 46, 46 one of which has an L-shaped bracket 48 (FIG. 4) to which is screwed a vertically extending circuit board 50, also containing components of the circuitry of the instrument. As shown in FIG. 4, the power lead wire 22 is plugged into a male terminal in the circuit board 50.

Also carried by the chassis 6 and resiliently supported at a number of regions of flexure is a test cell 52 having an outer cylindrical electrode 54 and an inner tubular cylindrical electrode 56 that is coaxial with the outer electrode 54. The lower ends of the electrodes 54, 56 have ears 58, 60 which project through a dielectric bottom closure plate 62 and are bent over to secure the metallic electrodes 54, 56 in place. A lead 64 may be taken from one of the ears of the inner electrode 56 for connection to the measuring circuitry. The outer electrode 54 projects upwardly through an opening 66 (FIG. 5) in the top member 24, and the upper end of the outer electrode 54 has a ring with an outwardly and downwardly turned flange member 68 that spans the gap in the opening 66 between the electrode 54 and the adjacent surface of the top member 24 at the opening 66. The upper end of the inner electrode 54 is closed off by a conical dielectric cap 70 that projects upwardly beyond the upper edge of the flange member 68.

The test cell 52 constitutes a capacitor having dielectric properties which will vary in accordance with the nature of the material introduced thereinto through its open top. Thus, for a predetermined weight of a given grain, the dielectric constant of the capacitor test cell will vary in accordance with the moisture content of the grain sample. The measuring circuitry hereinafter described in effect responds to different dielectric constants of the capacitor and therefore can be designed to measure the moisture content of the sample.

The invention also provides for initiating the operation of the measuring circuitry when a predetermined weight of the sample has been introduced into the annular test chamber 75 that is defined by the inner and outer electrodes and the insulating bottom plate 62. For this purpose upper and lower U-shaped angle bars 72, 74 are provided and which partially embrace the outer cylindrical electrode 54. The free ends of the angle bars 72, 74 are hingedly connected to the upper and lower end portions of the wings 46, 46 by spring steel elements 76 which are held in place by rivets 78 and retainer strips 80. In addition, the region of juncture of the legs and bight of each angle bar 72, 74 has spring steel elements 82, 82, rivets 84, and retainer strips 86, all similar to the elements 76, 78, 80 previously described. At these regions of juncture, the spring steel elements 82 provide flexible connections between the angle bars 72, 74 and radial ears 88 because the radial ears 88 are riveted to the spring steel elements 82. These radial ears 88 project from the upper and lower ends of the longitudinal strips 90, 92 that are riteted to the outer surface of the electrode 54. Consequently, there are four regions at which the test cell is resiliently supported for substantially vertical movement relative to the chassis.

A switch 94 is provided for closing upon accumulation of a predetermined amount of sample material within the test cell. Closing of switch 94 initiates (with delay) the high speed measuring cycle with just the right weight of material in the test cell. Overfilling of the test cell past this critical weight, as will usually occur, does not affect the moisture measurement because the measurement is made very quickly after such critical weight is in the test cell.

The switch 94 is of the single pole single throw type and includes a switch blade 96 (FIG. 3) supported on an insulating switch mount 98 which is, in turn, rigidly mounted on a bracket 100. The bracket carries upper and lower rubber stops 102, 104 against which a contact carrier plate 106 is adapted to abut. This plate 106 is rigidly mounted on the outer surface of the outer electrode 54, and is therefore movable therewith and carries a movable contact into engagement with a contact on the switch blade 96 when the correct weight of sample material has been introduced into the test cell. The addition of further material simply causes the plate 106 to bottom on the lower stop 104, leaving the switch 94 closed. When the test cell is emptied, the plate 106 abuts the upper stop 102 and the switch 94 is opened. Current from the ungrounded side of the switch 94 is carried to the circuit board 50 by way of conductor 110.

For biasing the test cell upwardly, namely in its normal position in which switch 94 is open, there is provided a pair of return springs 112, 112 the lower ends of which are hooked onto the lower angle bar 74. The upper ends of the return springs 112, 112 are hooked onto a cross bar 114 that is, in turn, secured by screws 116 to the web of the channel plate 36, projecting through opposed slots 118, 118 therein. Therefore, when the test cell is empty, the parts will appear as shown in full lines in FIG. 3, but when the test cell is loaded the parts will appear as shown in broken lines in that Figure.

Also mounted within the test chamber 75 of the test cell is a thermistor 120 which serves to detect the temperature of the test sample. The lead wire to the thermistor 120 may extend from posts 122, 122 that project radially inwardly from the outer electrodes 54. The lead wire (not shown) from the ungrounded side of the thermistor 120 extends to the circuit board 50 for suitable connection thereon.

The annular cross-sectional configuration of the test cell chamber 75 facilitates proper loading of the sample into the test cell. Thus, sample material poured at random from above the top surface of member 24 and through the open top entrance of the test chamber will, in general, be distributed by the conical cap 70 reasonably iniformly into the test cell so that the level of the sample is fairly uniform throughout.

Referring now to FIG. 6, it will be seen that the measuring circuitry comprises a variable oscillator 130 and a fixed frequency or reference oscillator 132. The oscillators are of conventional design. Suffice it to say, however, that the oscillator 130 has a tank circuit that includes capacitor 134 and adjustable tuning coil 138. Likewise, the reference oscillator 132 includes a tank circuit with capacitor 136 and adjustable tuning coil 140. It will be noted that the capacitor constituting the test cell 52 is connected across the tank circuit of the variable oscillator 130 whereby the oscillator frequency is affected by the dielectric constant of the material in the test cell. The oscillator 130, furthermore, incorporates a feedback amplitude control circuit 142 which serves to maintain a sufficient oscillator amplitude across the test cell under conditions of high loading as occurs when the test sample has a high moisture content.

The outputs of the oscillators 130, 132 are sent to a mixer 144 to produce a difference signal that is sent to a low pass filter 146. The output from the low pass filter to AND gate 148 will be a frequency which is the difference between the reference frequency ($f_R$) and the frequency of the variable oscillator ($f_V$), the latter being a function of the moisture content of the test sample. When no test sample is in the test cell 52, the two oscillators 130, 132 would be at the same frequency typically about 2,000 KHz. With a test sample of grain introduced into the test cell, however, the variable oscillator 130 would be lower in frequency whereby the difference frequency would be of some value which can be counted in a frequency counter and read out directly as percent moisture.

In order to obtain a stable time base against which the frequency difference can be counted, the output of the reference oscillator is fed along conductor 150 and through OR gate 152 and to the clock input $c$ of a 12 stage frequency divider 154. The divider 154 involves circuitry of known design and can be constructed with integrated circuits that are available commercially. The divider 154 has twelve outputs which divide the input frequency by respective powers of two. The arrangement shown in FIG. 6 utilizes output terminals 1, 11 and 12. Thus, the output at terminal 1 is one-half the input frequency, the output at terminal 11 is the input frequency divided by $2^{11}$, and the output at terminal 12 is the reference frequency divided by $2^{12}$. The output from terminal 11 is sent to AND gate 156 to gate the difference frequency, $f_R-f_V$, and transmit the same along conductor 158 to OR gate 160, and from there to the clock input of a three-decade counter 162. The decade counter 162 drives a readout device 164 which is displayed under the screen 30. The readout device may utilize conventional light-emitting diodes or other solid state devices.

The counting or reading cycle, initiated by the output from terminal 11, is terminated by the output from terminal 12. The output from terminal 12 is sent along conductor 166 to the OR gate 152 and serves to gate off pulses from the reference oscillator to the clock input of the divider 154. Thus, the count accumulated in the counter 162 and read out by the readout device 164 is the count during the time interval in which there is an output from the terminal 11.

The initiation of the measuring cycle takes place when the test cell switch 94 is closed. When this occurs a time delay circuit 169 functions to delay operation of the oscillators 130, 132. For this purpose, closing of the switch 94 causes capacitor 170 to charge through resistor 172. When capacitor 170 is charged a sufficient amount, it operates, through resistor 174 to provide sufficient base-emitter voltage to turn on transistor 176. Turn-on of transistor 176 provides a pulse through coupling capacitor 178 to drive a monostable or one-shot power multivibrator 180 that comprises transistors 182, 184. The output from the multivibrator 180 along conductor 186 is used to supply power to the remainder of the circuitry during the on-time interval of the multivibrator 180. This interval may be of the order of one minute. The circuit components of the multivibrator 180 are not described in detail herein since the circuitry is conventional.

As pointed out generally heretofore, the purpose of the delay is to compensate for the inertia effect of pouring the grain sample into the test cell. Thus, the time at which the voltage across the capacitor 170 is sufficient to turn on transistor 176 should be predetermined for the average or anticipated inertia resulting from sample pouring. This allows measuring to proceed when the requisite weight of sample material is in the test cell. Typically, the sample should be poured from about 6 inches (approx. 15 cm.) or less above the test cell with the time delay being about 0.1 second.

Should the contacts of the switch 94 have some erratic action and perhaps be interrupted momentarily, the measuring cycle will not be aborted since the capacitor 170 will only begin discharging momentarily through resistors 172 and 188. As soon as the contacts of the switch 94 are reestablished, the capacitor 170 continues charging until the proper voltage is reached to turn on transistor 176 and hence the multivibrator 180. Also if the switch contacts momentarily break after the multivibrator 180 has been turned on, the test will not be aborted. If the sample material is quickly poured out of the test cell before the multivibrator 180 shuts off, the switch 94 will open. Under such conditions the capacitor 170 discharges through resistors 172, 188, thereby aborting the power supply multivibrator 180 to leave the instrument in condition for another test. Finally if the sample is left in the test cell causing the switch 94 to remain closed past the on-time interval of the monostable multivibrator 180, there will thereafter be no power supplied from conductor 186 to the measuring circuitry.

Upon closing of switch 94 and subsequent triggering of the multivibrator 180, the positive terminal of the batteries 19 is applied to conductor 190, and through capacitor 192 a signal is applied to inverter 194. The output from inverter 194 produces a pulse at the set terminal S of flip-flop 168 so that the Q output of the flip-flop will permit gating of the difference frequency through the AND gate 148. The output from the inverter 194 also applies a pulse to the reset terminal of the decade counter 162 and, through OR gate 196, also applies a reset pulse to the frequency divider 154. This sets the circuitry for making the moisture reading count, as previously described.

FIG. 7 shows wave forms as a function of time at various points in the system when the switch 94 is closed. The wave form 200 shows the output at the Q terminal of flip-flop 168. The wave form 202 shows the output at terminal 11 of the frequency divider 154, this output being the reference frequency divided by $2^{11}$. The wave form 204 shows the output at terminal 12, which is the reference frequency divided by $2^{12}$. The wave form 206 shows the time interval of $f_R - f_V$ which is sent to the counter 162.

To give some idea of the speed at which the moisture reading takes place, if the reference oscillator operates at 2048 KHz., then there will be an output at terminal 12 in one millisecond after pulses begin at the clock input c. Furthermore, the instrument is calibrated and designed for a particular grain so that the pulse count into the counter 162 corresponds to the moisture reading. This may be effected experimentally by determining the moisture content of a number of samples of a predetermined weight, and then adjusting the circuit parameters for the correct readout. The moisture percent curve for grain, such as corn, has been found to be quite close to the output curve resulting from changes in capacitances of the test cell with samples of varying moisture content therein. Thus, in the embodiment of FIG. 6, the moisture reading is equal to $(f_R - F_V)/(f_R) \times 1024$.

After the moisture reading has been taken and before the multivibrator 180 cuts off, a temperature correction may be made by depressing the switch 34. When this occurs the flip-flop 168 receives a pulse to its reset terminal R causing its $\overline{Q}$ terminal to issue a pulse on conductor 208. This pulse is sent through capacitor 210 and OR gate 196 and to the reset terminal of the divider 164. The pulse from conductor 208 is also sent through capacitor 212 to trigger a temperature monostable multivibrator 214. The on-time of the multivibrator 214 is determined by the resistance of the thermistor 120 in the test cell 52. The pulse from conductor 208 also enables AND gate 216 so that pulses from terminal 1 of the divider 154 will pass through gate 216, over conductor 217 and to AND gate 218. The output from the multivibrator 214 on conductor 220 enables AND gate 218 so that pulses from terminal 1 of the divider 154 can pass over conductor 222, through OR gate 160 and to the counter 162. Again, the output from terminal 1 of the divider 154 is terminated by the on-going output from terminal 12 of the divider 154. During the time that pulses are issuing from terminal 1 of divider 154 there will be an additional 1,024 pulses sent into the counter 162 less whatever number of pulses are inhibited by disabling the gate 218. Disabling of gate 218 will occur when the multivibrator 214 turns on. The 1,024 pulses issuing from terminal 1 of divider 154 is arrived at by reason of the fact that in any twelve stage frequency divider there will be $2^{10}$ or 1,024 pulses out of the terminal 1 if the input is gated off by the terminal 12 output.

The arrangement herein contemplated is designed so that if the thermistor 120 senses a reference temperature of 25°C, 24 pulses are inhibited by the multivibrator 214, resulting in a net addition of 1,000 pulses into the counter 162, which is a three decade counter. With a three decade counter, 1,000 pulses simply rolls the counter through zero and back to the original reading with the result that there is no change resulting frm the actuation of the temperature control cycle. On the other hand, if the thermistor 120 senses a higher temperature, the multivibrator period is lengthened, reducing the number of pulses for temperature correction sent into the counter 162. A lower temperature sensed by the thermistor 120 produces the opposite effect.

FIG. 8 shows wave forms as concerns the temperature correction when switch 34 is closed. Wave form 224 shows the Q output from the flip-flop 168. Wave form 226 shows the on and off of the multivibrator 214 while wave form 228 shows the output from terminal 12 of the divider 154. Wave form 230 shows the time interval for the output from gate 218 on conductor 222, it being noted that the curve 230 does not rise until the multivibrator 214 cuts off, opening gate 218.

Figure 9:
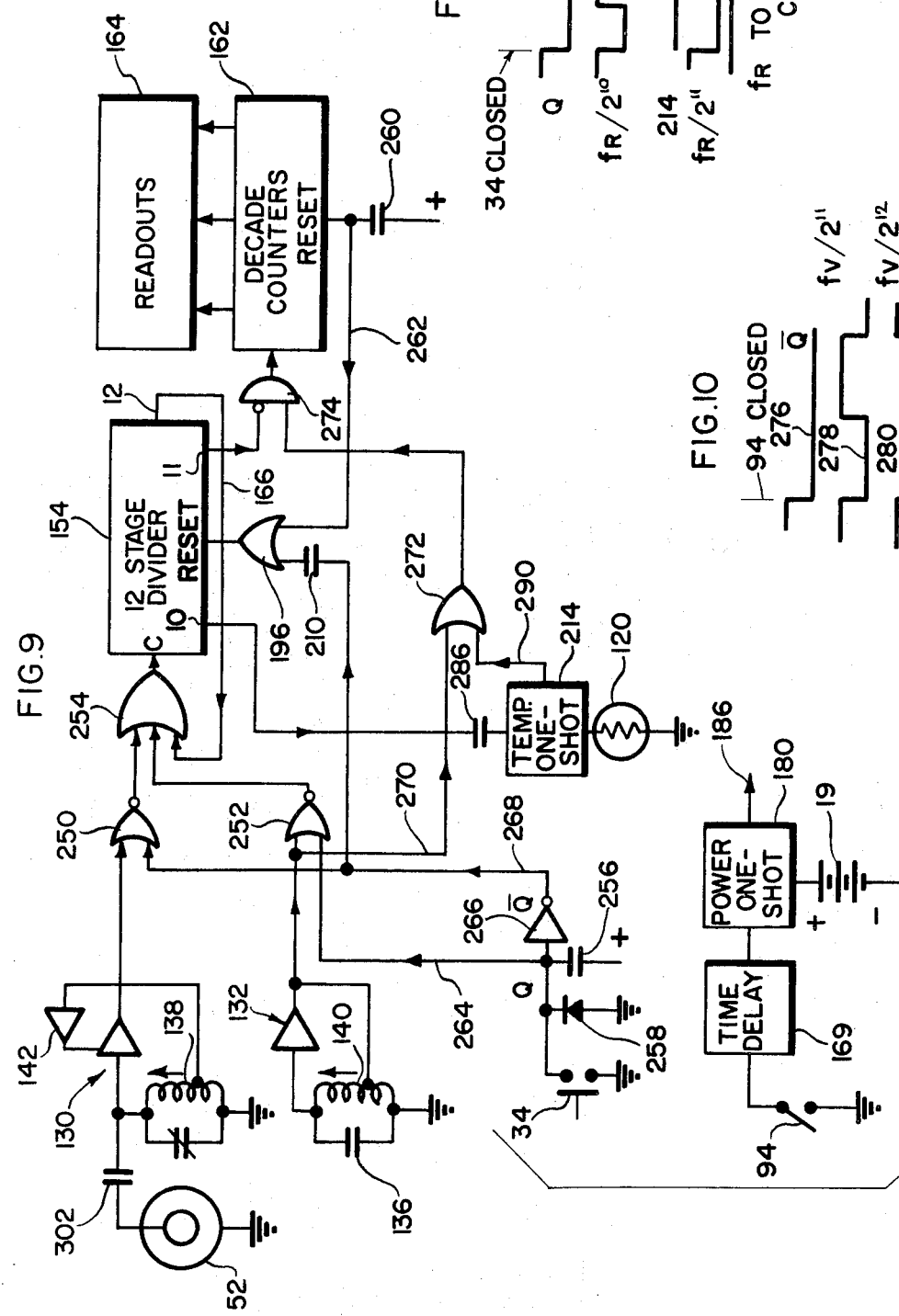
FIG. 9 is a logic diagram showing another technique for moisture measurement in accordance with the invention.

FIG. 9 shows another way of relating the outputs of the oscillators 130, 132 to provide a series of pulses to be sent into the counter 162. In the arrangement of FIG. 9, the mixing operation of FIG. 6 is eliminated and the frequency of the variable oscillator 130 is divided down for a time base against which the frequency of the reference oscillator 132 is counted. The logic arrangement of FIG. 9 includes NOR gates 250, 252, the outputs from which go to OR gate 254. The output from the gate 254 goes to the clock input of the divider 154. Also, in FIG. 9 the parts corresponding to those in FIG. 6 bear like reference characters.

When test cell switch 94 is closed, power turn-on from the multivibrator 180 establishes the moisture reading cycle through capacitor 256 and diode 258. In addition, the power turn-on provides, through capacitor 260, conductor 262 and OR gate 196, a reset of the 12 stage divider 154 and of the counter 152. The capacitor 256 serves the memory function that was served by the flip-flop 168 in FIG. 6. The output on conductor 264 serves to disable the gate 252 while the $\overline{Q}$ output from inverter 266 is sent over conductor 268 to enable gate 250. Thus, the output from the reference oscillator 132 may now proceed over conductor 270, through OR gate 272 and to AND gate 274. The gate 274 is enabled by the output from terminal 11 of the divider 154. Consequently, the output of the reference oscillator will be counted during the interval represented by the time at terminal 11 of the divider 154 since the latter is turned off by the output of the terminal 12 being sent back to gate 254 just as in the arrangement of FIG. 6.

Figure 10:
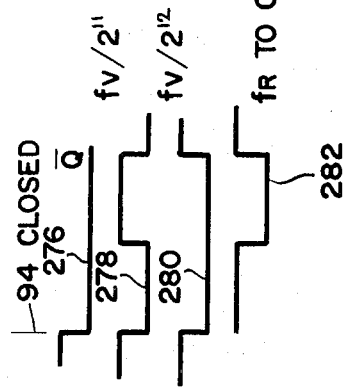

FIG. 10 shows various wave forms as a function of time upon closing the test cell switch 94. Wave form 276 shows the $\overline{Q}$ output while wave form 278 shows the output from terminal 11 of divider 154. Wave form 280 shows the output from terminal 12 of divider 154 while wave form 282 shows the interval during which the reference frequency is sent into the counter 162. The moisture reading count may be represented by the equation $(f_R/f_V) \times 1024 - 1000$.

When temperature correction switch 34 is depressed, the logic state of Q and $\overline{Q}$ will change enabling gate 252 and disabling gate 250. The states of Q and $\overline{Q}$ reverse due to the discharge of capacitor 256 caused by closing of switch 34. The change of logic state on conductor 268 issues a pulse to reset the divider 154. At this time the reference oscillator output 132 is gated into the clock input c of the divider 154.

The output of the reference oscillator 132 is also sent over conductor 270 and to gate 274 the latter being opened by the output from the terminal 11 of the divider 154. Terminal 10 of the divider has an output frequency which gives the reference frequency divided by $2^{10}$. The terminal 10 output triggers the temperature monostable multivibrator 214 through capacitor 286. The on-time of the multivibrator 214 will be determined by the deviation of the sample temperature from the reference temperature, as sensed by the thermistor 120. The output of the multivibrator 214 on conductor 290 disables the gate 272 for a time dependent upon the temperature of the sample, thereby gating 1,024 pulses into the counter 162 less those pulses inhibited during the on-time of the multivibrator 214. As before, if the reference temperature is sensed, the on-time multivibrator 214 will be such that 1,000 pulses are sent into the counter.

Figure 11:
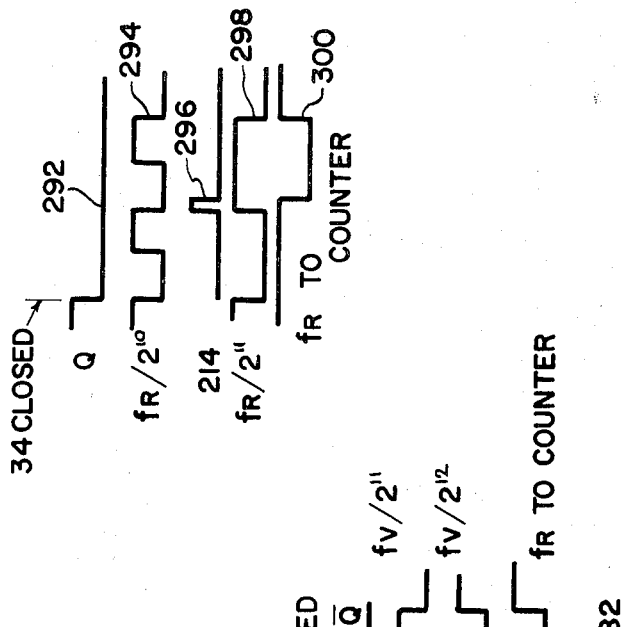
FIGS. 10 and 11 show wave forms as a function of time at points in the arrangement of FIG. 9 during operation thereof.

FIG. 11 shows the wave forms following turn-on of the switch 34. Wave form 296 shows the output at terminal 10 of the divider 154 while wave form 296 shows the output on conductor 290 from the multivibrator 214. Wave form 298 shows the output at terminal 11 of the divider 154 and wave form 300 shows the interval at which the reference frequency is sent to the counter 162.

It will be noted that the system of FIG. 9 produces a different relationship of readout as a function of capacitance added to the test cell. This will be apparent from the mathematical expression of moisture reading hereinbefore described. The arrangement of FIG. 9 produces a curve of capacitance as a function of moisture content that has greater slope but less curvature as compared to the arrangement of FIG. 6. This permits the use of capacitor 302 to vary both the curvature and slope of the curve of capacitance as a function of moisture content. It is noted that capacitor 302 is in the variable oscillator tank circuit and is in series with the test cell capacitor 52. Since the capacitor 302 has the effect of reducing the slope of the aforesaid curve but increasing its curvature, the arrangement of FIG. 9 can be made to have essentially the same curve as that of FIG. 6. Furthermore, with changes in value of the series capacitance 302, it is possible to produce a family of curves with varying slopes and curvature as may be required to read directly in per cent moisture for different types of grains which may be tested.

The invention is claimed as follows:

1. A moisture tester having a test cell, said test cell comprising a capacitor having means including spaced electrodes providing a chamber for receiving a sample to be tested such that the dielectric constant of the capacitor is modified in accordance with the dielectric constant of the sample due to moisture therein, said test chamber having an open top through which sample material is poured, circuit means including said capacitor for issuing signal means in accordance with the moisture content of the sample, means responsive to said issued signal means for providing a visual readout representative of said moisture content, and initiating means operable in response to the accumulation of a predetermined weight of sample material in said chamber for triggering the operation of the circuit means, said circuit means and said visual readout means cooperating to provide said visual readout sufficiently rapidly after operation of said initiating means such that the pouring of sample material into said chamber in excess of said predetermined weight does not significantly affect said readout, said initiating means comprising switch means and time delay means so connected that the operation of said circuit means is triggered upon closing of said switch means followed by the time delay of said time delay means, said time delay being sufficient to compensate for the inertia effect due to pouring of the sample material into said test cell so that the measurement of moisture content proceeds substantially when said predetermined weight of sample material is in said chamber.

2. A moisture tester according to claim 1 including resilient means for supporting said test cell, spring means normally biasing said test cell to a position in which said switch is open, said resilient supporting means and said spring means being such that the predetermined accumulation of sample material deflects the test cell sufficiently to close said switch.

3. A moisture tester according to claim 1 including circuit means for issuing correction signals to said readout means to modify the readout as a function of temperature variation of the sample from a predetermined reference temperature.

4. A moisture tester according to claim 1 in which said initiating means further includes a monostable multivibrator that is triggered by said time delay means for supplying power for a predetermined time to said circuit means whereby to provide the readout and then shut off power to said circuit means after said predetermined time.

5. A moisture tester according to claim 1 in which said circuit means includes a variable frequency oscillator, a reference oscillator, said capacitor being across the tank circuit of said variable oscillator, and means for relating the outputs of the two oscillators to provide said issued signal means as a series of pulses.

6. A moisture tester according to claim 5 including means for issuing correction signals to said readout means to modify the readout as a function of temperature variation of the sample from a predetermined reference temperature, said last-named means including means for supplying a series of pulses for response by said readout means, said series of pulses being a predetermined number of pulses less a number of pulses representing the temperature variation.

7. A moisture tester according to claim 5 in which the relating means comprises means for mixing the outputs of the oscillators to provide a difference frequency that produces said series of pulses; and said circuit means also includes a counter for receiving said pulses, and means for gating said pulses to said counter for an ascertainable time interval that is determined by the reference frequency.

8. A moisture tester according to claim 5 in which the relating means comprises means for dividing down the frequency of the variable oscillator for a time interval in which the reference frequency is counted to produce said pulses; and a counter for receiving said pulses.

9. A moisture tester according to claim 8 including a further capacitance connected to the tank circuit of the variable oscillator and being in series with the test cell capacitor.

10. A moisture tester according to claim 8 including means for issuing correction signals to said readout means to modify the readout as a function of temperature variation of the sample from a predetermined reference temperature, said last-named means including means for supplying a series of pulses to said counter, said series of pulses being a predetermined number of pulses less a number of pulses representing a temperature variation.

11. A moisture tester according to claim 10 including manually operable switch means for initiating the operation of the temperature correction means independently of the operation of the circuit means that produces said series of pulses in accordance with the sample moisture content.

12. A moisture tester having a test cell, said test cell comprising a capacitor having means including coaxial electrodes providing a chamber for receiving a sample to be tested, a switch actuated by said test cell, resilient means for supporting said test cell, spring means for biasing said test cell to a position in which said switch is open, said test cell being movable in opposition to said spring means to close said switch upon accumulation of a predetermined weight of sample material in said chamber, measuring circuit means initiated following closing of said switch for issuing a series of pulses in accordance with the moisture content of the sample, a counter for receiving said pulses, digital readout means driven by said counter for giving a visual readout representing per cent moisture by weight of the sample at a reference temperature, said circuit means, counter and readout means being operable at such speed upon accumulation of said predetermined weight such that introduction of sample material into said chamber in excess of said predetermined weight does not significantly affect said readout, and means for introducing additional pulses into said counter in accordance with a variation between the temperature of the sample and the reference sample to provide a readout that is temperature corrected.

13. A moisture tester according to claim 12 including a chassis, said resilient means includes spring elements supporting said test cell on said chassis at a number of regions of flexure, and the chamber being annular in cross-section.

14. Testing apparatus comprising a variable frequency oscillator and a reference frequency oscillator, said variable frequency oscillator having a capacitor across its tank circuit that constitutes a test cell that receives a sample of material to be tested and wherein the dielectric constant of the capacitor is modified in accordance with the characteristics to be tested of the sample, and circuit means for relating the outputs of the two oscillators to provide a series of pulses representing said characteristics of the sample; said circuit means including a multi-stage frequency divider, a counter for receiving said pulses, and a readout device driven by said counter.

15. Testing apparatus according to claim 14 in which the output of the variable oscillator clocks the frequency divider and output of the reference oscillator is gated to the counter during a time interval represented by the on-time of a stage of the divider.

16. Testing apparatus according to claim 14 in which the outputs of the two oscillators are mixed to provide a difference frequency, the output of the reference oscillator clocks said frequency divider, and the difference frequency is gated to the counter during the on-time of a stage of the divider.

17. Testing apparatus according to claim 14 including means for gating correction pulses to said counter, said last-named means including an output from a stage of said frequency divider.

18. Testing apparatus according to claim 17 including a monostable multivibrator for controlling the gating of said correction pulses, and sensing means for determining the period of said multivibrator.

19. A moisture tester having a chassis, a test cell comprising a capacitor having means providing a test chamber for receiving a sample to be tested, a switch actuated by said test cell, means including spring elements forming hinge connections between said chassis and test cell for supporting said test cell on said chassis, spring means for biasing said test cell to a position in which said switch is open, said test cell being movable in opposition to said spring means to close said switch upon accumulation of a predetermined weight of sample material in said chamber, and means responsive to the closing of said switch for initiating a readout representing the moisture content of the sample.

20. A moisture tester according to claim 19 in which said switch means includes a contact plate carried by the test cell and a movable contact carried by said plate, a fixed contact carried by said chassis for engagement by said movable contact, and said chassis has upper and lower stops for respective engagement by said contact plate when the switch is open and closed.

21. A moisture tester according to claim 19 including circuit board means carried by said chassis, a receptacle for telescopically receiving said chassis, said chassis having a top member with a top surface exposed when the chassis and receptable are assembled, and said test cell having an annular cross-section with an outer electrode that projects through said top member beyond said top surface whereby the test chamber entrance and through which sample material is poured lies above said top surface.

* * * * *